US 12,531,670 B2

(12) United States Patent
Islam et al.

(10) Patent No.: US 12,531,670 B2
(45) Date of Patent: Jan. 20, 2026

(54) MULTIPLEXING OF UPLINK CONTROL INFORMATION (UCI) WITH DIFFERENT PHYSICAL LAYER PRIORITIES

(71) Applicant: Intel Corporation, Santa Clara, CA (US)

(72) Inventors: Toufiqul Islam, Santa Clara, CA (US); Debdeep Chatterjee, San Jose, CA (US); Sergey Panteleev, Maynooth (IE); Salvatore Talarico, Los Gatos, CA (US); Gang Xiong, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 219 days.

(21) Appl. No.: 18/281,721

(22) PCT Filed: May 11, 2022

(86) PCT No.: PCT/US2022/028678
§ 371 (c)(1),
(2) Date: Sep. 12, 2023

(87) PCT Pub. No.: WO2022/240926
PCT Pub. Date: Nov. 17, 2022

(65) Prior Publication Data
US 2024/0178946 A1 May 30, 2024

Related U.S. Application Data

(60) Provisional application No. 63/230,660, filed on Aug. 6, 2021, provisional application No. 63/187,279, filed on May 11, 2021.

(51) Int. Cl.
*H04W 72/02* (2009.01)
*H04L 1/1812* (2023.01)
(Continued)

(52) U.S. Cl.
CPC .......... *H04L 1/1887* (2013.01); *H04L 1/1812* (2013.01); *H04W 72/21* (2023.01)

(58) Field of Classification Search
None
See application file for complete search history.

(56) References Cited

U.S. PATENT DOCUMENTS

| 2021/0105766 A1 | 4/2021 | Wang et al. |
| 2023/0300840 A1 | 9/2023 | Zhang et al. |

(Continued)

FOREIGN PATENT DOCUMENTS

| CN | 111278118 | 6/2020 |
| JP | 2021029029 | 2/2021 |

(Continued)

OTHER PUBLICATIONS

"International Application Serial No. PCT US2022 028678, International Preliminary Report on Patentability mailed Nov. 23, 2023", 6 pgs.

(Continued)

*Primary Examiner* — Bo Hui A Zhu
(74) *Attorney, Agent, or Firm* — Schwegman Lundberg & Woessner, P.A.

(57) ABSTRACT

A user equipment (UE) configured for operation in a fifth-generation new radio (5GNR) system may multiplex high-priority (HP) hybrid automatic repeat request acknowledge (HARQ-ACK) bits corresponding to a first HARQ-ACK code-book with low-priority (LP) HARQ-ACK bits corresponding to a second HARQ-ACK codebook onto a physical uplink control channel (PUCCH) transmission to a gNode B (gNB). The UE may be configured with the first HARQ-ACK codebook and the second HARQ-ACK codebook of different priorities. The HP HARQ-ACK bits may be encoded with a first maximum code rate (maxCodeRate) and (Continued)

the LP HARQ-ACK bits may be encoded with a second maximum code rate. The maximum code rates may be configured to the UE via RRC signalling per PUCCH format.

20 Claims, 5 Drawing Sheets

(51) Int. Cl.
*H04L 1/1867* (2023.01)
*H04W 72/21* (2023.01)

(56) References Cited

U.S. PATENT DOCUMENTS

2023/0318748 A1* 10/2023 Yin .................. H04L 1/1854 370/329
2024/0380513 A1* 11/2024 Jung .................. H04L 1/0013

FOREIGN PATENT DOCUMENTS

| JP | 2023537592 | 9/2023 |
| WO | WO-2022240926 A1 | 11/2022 |
| WO | 2022240926 | 9/2023 |

OTHER PUBLICATIONS

"Japanese Application Serial No. 2023-555136, Notification of Reasons for Refusal mailed Nov. 19, 2024", w English translation, 11 pgs.

"Japanese Application Serial No. 2023-555136, Response filed Feb. 14, 2025 to Notification of Reasons for Refusal mailed Nov. 19, 2024", w English claims, 11 pgs.

Wilus, Inc, "Discussion on multi-PDSCH PUSCH scheduling for NR from 52.6GHz to 71GHz", 3GPP TSGRANWG1 #104b-e RI-2103693, [Online]. Retrieved from the Internet: URL:https: www.3gpp.org ftp tsg_ranAVGI_RLITSGRI_104b-e Docs RI-2103693.zip, (Apr. 7, 2021).

"Japanese Application Serial No. 2023-555136, Voluntary Amendment Filed Nov. 27, 2023", w English Claims, 15 pgs.

"Japanese Application Serial No. 2023-555136, Notification of Reasons for Refusal mailed May 13, 2025", w English Translation, 15 pgs.

"Korean Application Serial No. 10-2023-7033621, Voluntary Amendment Filed May 9, 2025", w English Claims, 29 pgs.

"International Application Serial No. PCT/US2022/028678, International Search Report mailed Sep. 14, 2022", 3 pgs.

"International Application Serial No. PCT/US2022/028678, Written Opinion mailed Sep. 14, 2022", 4 pgs.

"Intra-UE Multiplexing/Prioritization", R1-2103327, 3GPP TSG RAN WG1 Meeting #104b-e, e-Meeting, (Apr. 6, 2021), 8 pgs.

"On UL intra-UE multiplexing and prioritization enhancements", R1-2102820, 3GPP TSG RAN WG1 Meeting #104b-e, e-Meeting, (Apr. 6, 2021), 28 pgs.

"UE feedback enhancements for HARQ-ACK", R1-2102351, 3GPP TSG RAN WG1 Meeting #104b-e, e-Meeting, (Apr. 7, 2021), 11 pgs.

Wilus Inc., "Discussion on intra-UE multiplexing/prioritization for URLLC/IIoT", R1-2103697, 3GPP TSG RAN WG1 Meeting #104b-e, e-Meeting, (Apr. 7, 2021), 12 pgs.

"Japanese Application Serial No. 2023-555136, Response filed Aug. 8, 2025 to Notification of Reasons for Refusal mailed May 13, 2025", W English Claims, 26 pgs.

\* cited by examiner

MULTIPLEXING OF UPLINK CONTROL INFORMATION (UCI) WITH DIFFERENT PHYSICAL LAYER PRIORITIES

PRIORITY CLAIM

This application is a U.S. National Stage Filing under 35 U.S.C. 371 from International Application No. PCT/US2022/028678, filed May 11, 2022 and published in English as WO 2022/240926 on Nov. 17, 2022, which claims priority to U.S. Provisional Patent Application Ser. No. 63/187,279, filed May 11, 2021 [reference number AD6543-Z], and U.S. Provisional Patent Application Ser. No. 63/230,660, filed Aug. 6, 2021 [reference number AD8251-Z], which are incorporated herein by reference in their entireties.

TECHNICAL FIELD

Embodiments pertain to wireless communications. Some embodiments relate to wireless networks including 3GPP (Third Generation Partnership Project) and fifth-generation (5G) networks including 5G new radio (NR) (or 5G-NR) networks. Some embodiments relate to sixth-generation (6G) networks. Some embodiments relate to transmission of uplink control information (UCI) including Hybrid Automatic Repeat Request Acknowledgement (HARQ-ACK) feedback.

BACKGROUND

Mobile communications have evolved significantly from early voice systems to today's highly sophisticated integrated communication platform. With the increase in different types of devices communicating with various network devices, usage of 3GPP 5G NR systems has increased. The penetration of mobile devices (user equipment or UEs) in modern society has continued to drive demand for a wide variety of networked devices in many disparate environments. 5G NR wireless systems are forthcoming and are expected to enable even greater speed, connectivity, and usability, and are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Different services may be supported in a carrier or serving cell and a NR UE may support one or more service types. If communication of more than one service type with varying reliability and latency requirements can be made in a carrier/serving cell, it is possible that scheduled/configured resource for transmission of a first service type may overlap with resource for transmission of a second service type for a given UE. To handle collisions and prioritize more urgent transmissions, resources may be scheduled or configured for either high or low physical layer (PHY) priorities which may result in the dropping of lower priority transmissions. One issue with this is that the lower priority transmission may carry control information which may be detrimental to UE operations if dropped.

Thus there are general needs for systems and methods that, among other things, reduce the dropping of lower priority transmissions, particularly control information.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments are directed to a user equipment (UE) configured for operation in a fifth-generation new radio (5G NR) system. In these embodiments, the UE may multiplex high-priority (HP) hybrid automatic repeat request acknowledge (HARQ-ACK) bits corresponding to a first HARQ-ACK codebook with low-priority (LP) HARQ-ACK bits corresponding to a second HARQ-ACK codebook onto a physical uplink control channel (PUCCH) transmission to a gNode B (gNB). The UE may be configured with the first HARQ-ACK codebook and the second HARQ-ACK codebook and the codebooks may have different priorities. The UE may also encode the HP HARQ-ACK bits with a first maximum code rate (maxCodeRate) and may encode the LP HARQ-ACK bits with a second maximum code rate. The first and second maximum code rates may be configured to the UE via RRC signalling, although the scope of the embodiments is not limited in this respect. These embodiments as well as other embodiments are discussed in more detail below.

Figure 1A:
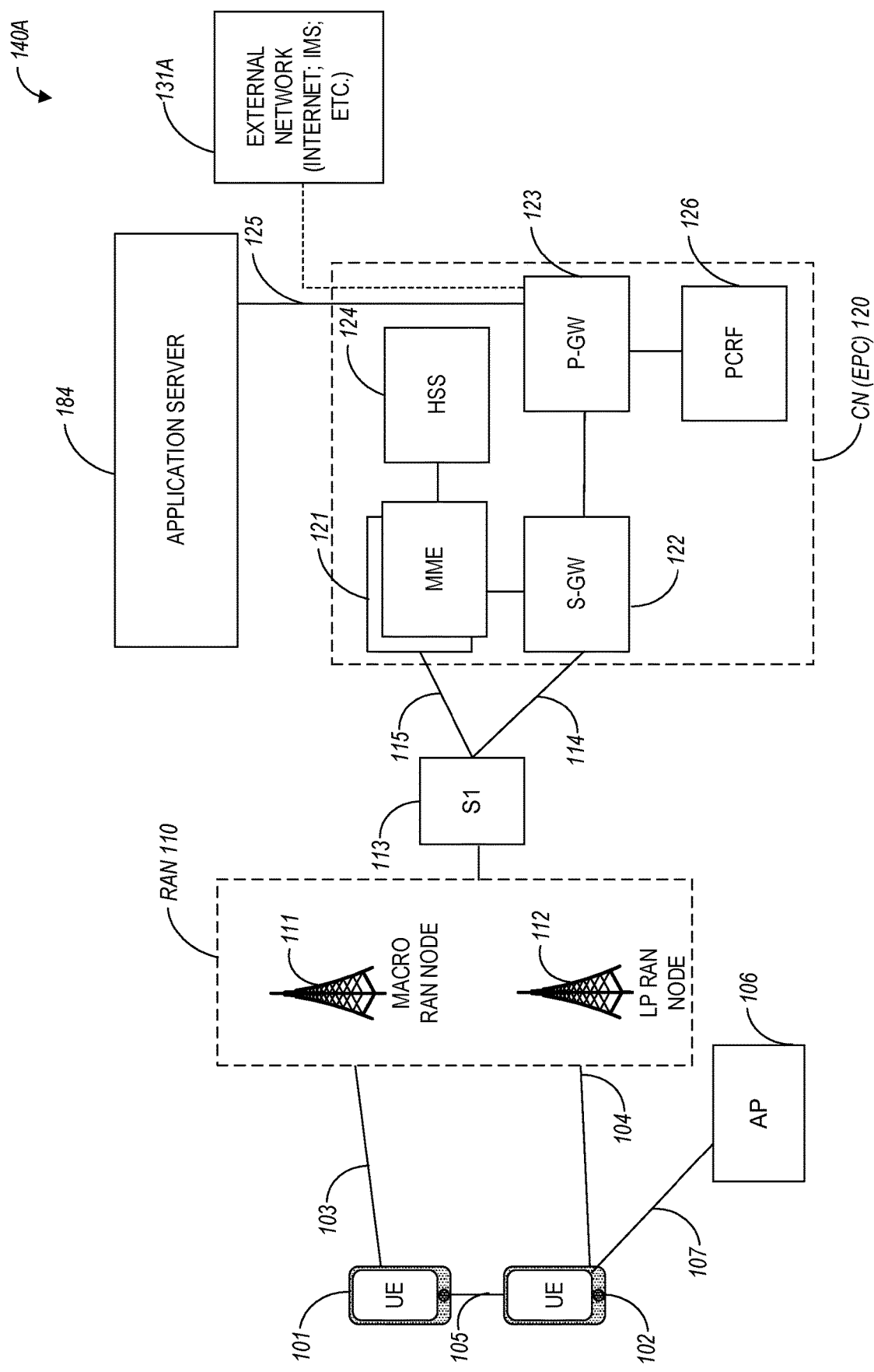
FIG. 1A illustrates an architecture of a network, in accordance with some embodiments.

FIG. 1A illustrates an architecture of a network in accordance with some embodiments. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some embodiments, carrier aggregation may be used where one or more component carriers operate on unlicensed frequencies.

Embodiments described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHZ, 3.6-3.8 GHz, and further frequencies and Spectrum Access System (SAS) in 3.55-3.7 GHZ and further frequencies).

Embodiments described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some embodiments, any of the UEs 101 and 102 can comprise an Internet-of-Things (IOT) UE or a Cellular IoT (CIOT) UE, which can comprise a network access layer designed for low-power IoT applications utilizing short-lived UE connections. In some embodiments, any of the UEs 101 and 102 can include a narrowband (NB) IoT UE (e.g., such as an enhanced NB-IoT (eNB-IOT) UE and Further Enhanced (FeNB-IOT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some embodiments, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some embodiments, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro-RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In embodiments, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility embodiments in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VOIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some embodiments, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some embodiments, the communication network 140A can be an IoT network or a 5G network, including 5G new radio network using communications in the licensed (5G NR) and the unlicensed (5G NR-U) spectrum. One of the current enablers of IT is the narrowband-IoT (NB-IOT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some embodiments, the gNBs and the NG-eNBs can be connected to the AMF by NG-C interfaces, and to the UPF by NG-U interfaces. The gNBs and the NG-eNBs can be coupled to each other via Xn interfaces.

In some embodiments, the NG system architecture can use reference points between various nodes as provided by 3GPP Technical Specification (TS) 23.501 (e.g., V15.4.0, 2018-12). In some embodiments, each of the gNBs and the NG-eNBs can be implemented as a base station, a mobile edge server, a small cell, a home eNB, and so forth. In some embodiments, a gNB can be a master node (MN) and NG-eNB can be a secondary node (SN) in a 5G architecture.

Figure 1B:
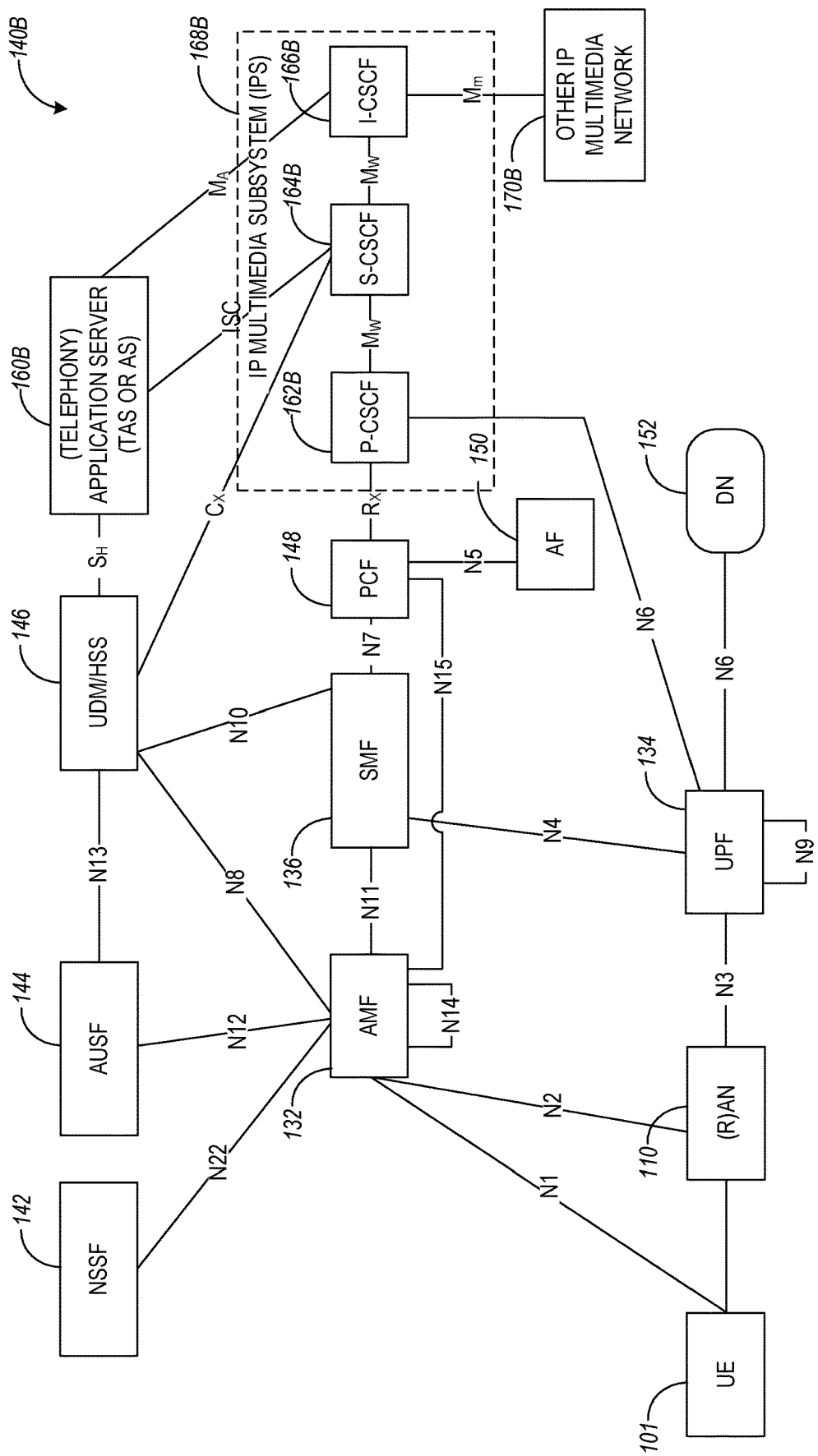
FIG. 1B and FIG. 1C illustrate a non-roaming 5G system architecture in accordance with some embodiments.

FIG. 1B illustrates a non-roaming 5G system architecture in accordance with some embodiments. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some embodiments, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain embodiments of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some embodiments, the I-CSCF 166B can be connected to another IP multimedia network 170E, e.g. an IMS operated by a different network operator.

In some embodiments, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
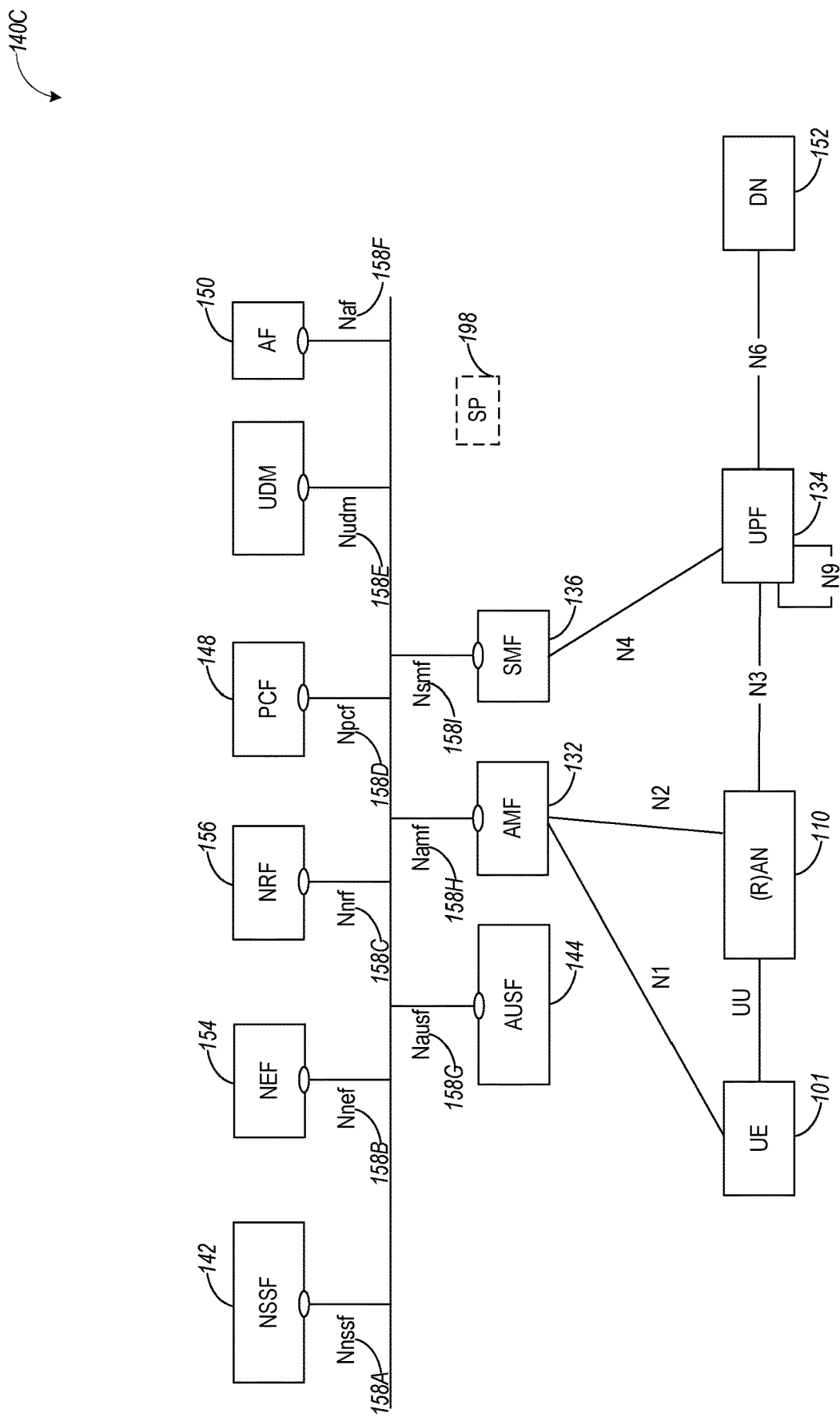

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some embodiments, 5G system architectures can be service-based and interaction between network functions can be represented by corresponding point-to-point reference points Ni or as service-based interfaces.

In some embodiments, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

In some embodiments, any of the UEs or base stations described in connection with FIGS. 1A-1C can be configured to perform the functionalities described herein.

Rel-15 NR systems are designed to operate on the licensed spectrum. The NR-unlicensed (NR-U), a shorthand notation of the NR-based access to unlicensed spectrum, is a technology that enables the operation of NR systems on the unlicensed spectrum.

Some embodiments are directed to a user equipment (UE) configured for operation in a fifth-generation new radio (5G NR) system. In these embodiments, the UE may be configured with a first hybrid automatic repeat request acknowledge (HARQ-ACK) codebook and a second HARQ-ACK codebook. The codebooks may have different priorities. For example, the first HARQ-ACK codebook may have a first priority and the second HARQ-ACK codebook may have a second priority, and the first HARQ-ACK codebook may have a higher priority than the second HARQ-ACK codebook, although this is not a requirement.

In these embodiments, the UE may decode a first downlink control information (DCI) format that includes a scheduling grant for a first physical downlink shared channel (PDSCH). The first DCI format may indicate the first priority for HARQ-ACK information for the first PDSCH. The UE may also decode a second DCI format that includes a scheduling grant for a second PDSCH. The second DCI format may indicate the second priority for HARQ-ACK information for the second PDSCH. In these embodiments, the UE may multiplex high-priority (HP) HARQ-ACK bits corresponding to the first codebook with low-priority (LP) HARQ-ACK bits corresponding to the second codebook onto a physical uplink control channel (PUCCH) transmission to a gNode B (gNB). In these embodiments, the UE may encode the HP HARQ-ACK bits with a first maximum code rate (maxCodeRate) and encode the LP HARQ-ACK bits with a second maximum code rate. In these embodiments, the first and second maximum code rates may be configured to the UE via RRC signalling. The first and second maximum code rates may be stored in memory of the UE. In these embodiments, for multiplexing a high-priority (HP) HARQ-ACK and a low-priority (LP) HARQ-ACK into a PUCCH, an additional maxCodeRate for LP HARQ-ACK may be configured in the second PUCCH-Config per PUCCH format. These embodiments are discussed in more detail herein.

In some embodiments, to multiplex the HP HARQ-ACK bits and the LP HARQ-ACK bits, the UE may determine a total number of HARQ-ACK bits for the PUCCH transmission and separately encode the HP HARQ-ACK bits and the LP HARQ-ACK bits for transmission in the PUCCH when the number of HARQ-ACK bits is more than two. In these embodiments, for multiplexing a high-priority (HP) HARQ-ACK and a low-priority (LP) HARQ-ACK into a PUCCH, when the total number of LP and HP HARQ-ACK bits is more than two, the UE may be configured to support separate coding for the two HARQ-ACKs.

In some embodiments, when the number of HARQ-ACK bits is equal to two, each of the HARQ-ACK bits may be treated as a high-priority bit and may be encoded for transmission in the PUCCH as HP HARQ-ACK bits. In these embodiments, the HARQ-ACK bits may be jointly encoded using the first maximum code rate, which is used for high-priority HARQ-ACK feedback. In these embodiments, for multiplexing a high-priority (HP) HARQ-ACK and a low-priority (LP) HARQ-ACK into a PUCCH, when the total number of LP and HP HARQ-ACK bits is two, the UE may treat the two bits as HARQ-ACK bits with High priority, although the scope of the embodiments in not limited in this respect.

In some embodiments, the UE may refrain from separately encoding the HP HARQ-ACK bits and the LP HARQ-ACK bits for transmission in the PUCCH when the number of HARQ-ACK bits is not more than two.

In some embodiments, the DCI format comprises one of a DCI format 1_1 and a DCI format 1_2. In these embodiments, DCI format 1_1 or DCI format 1_2 can schedule a PDSCH reception and trigger a PUCCH transmission with corresponding HARQ-ACK information of any priority. In these embodiments, for PUSCH scheduling, DCI format 0_1 or a DCI format 0_2 can schedule a PUSCH transmission of any priority with corresponding HARQ-ACK information of any priority.

In some embodiments, to multiplex the HP HARQ-ACK bits and the LP HARQ-ACK bits, the UE may determine a PUCCH resource set based on a uplink control information (UCI) size. The UCI size may comprise a number of HP UCI bits plus a number of LP UCI bits. The HP UCI bits may include the HP HARQ-ACK bits and the LP UCI bits may include the LP HARQ-ACK bits. In these embodiments, PUCCH resource set determination may be based on UCI payload size.

In some embodiments, the UE may decode RRC signalling comprising a PUCCH-Config information element (IE) to configure the UE with a plurality of PUCCH resource sets. Each PUCCH resource set (PUCCH-ResourceSet) may have a PUCCH resource set index indicated with a pucch-ResourceSetId. Each PUCCH resource set may have a maximum number of UCI information bits that the UE can transmit using a PUCCH resource in the PUCCH resource set indicated by maxPayloadSize. In these embodiments, the UE may select a PUCCH resource set from the plurality based on the maxPayloadSize, although the scope of the embodiments is not limited in this respect. In these embodiments, a IE PUCCH-Config may be used to configure UE specific PUCCH parameters (per BWP). The UCI size should be less than or equal to the maxPayloadSize of the selected PUCCH resource set. In these embodiments, the maxPayloadSize may indicate a maximum number of UCI information bits that the UE may transmit using this PUCCH resource set. In a PUCCH occurrence, the UE may choose the first of its PUCCH-ResourceSet which supports the number of bits that the UE wants to transmit. The field may be absent in the first set (Set0) and in the last configured set since the UE derives the maximum number of UCI information bits.

In some embodiments, the UE may decode a first PUCCH resource configuration information (PUCCH-Config) and a second PUCCH-Config received from the gNB. The first PUCCH-Config may indicate the first maximum code rate for a configured PUCCH format and the second PUCCH-Config may indicate the second maximum code rate for the same configured PUCCH format. In these embodiments, a maximum code rate (maxCodeRate) may be configured per PUCCH format. In some embodiments, more than one maximum code rate may be configured per PUCCH format when the resource corresponding to PUCCH format is configurable to carry multiplexed HARQ-ACK bits. In these embodiments, an additional maxCodeRate for the LP HARQ-ACK bits may be configured in a second PUCCH-Config per PUCCH format.

In some embodiments, the UE may configure a PUCCH transmission in accordance with the configured PUCCH format. The PUCCH transmission may include the HP HARQ-ACK bits multiplexed with the LP HARQ-ACK bits. In these embodiments, the HP HARQ-ACK bits may be encoded in accordance with the first maximum code rate and the LP HARQ-ACK bits may be encoded in accordance with the second maximum code rate. In these embodiments, the first and the second maximum code rates may be configured for the same configured PUCCH format. In these embodiments, an additional maxCodeRate for LP HARQ-ACK may be configured in a second PUCCH-Config per PUCCH format. These embodiments are described in more detail below.

Some embodiments are directed to a non-transitory computer-readable storage medium that stores instructions for execution by processing circuitry of a user equipment (UE) configured for operation in a fifth-generation new radio (5G NR) system. In these embodiments, the UE may be configured with a first hybrid automatic repeat request acknowledge (HARQ-ACK) codebook and a second HARQ-ACK codebook. As discussed above, the codebooks may have different priorities and the first HARQ-ACK codebook may have a first priority, the second HARQ-ACK codebook may have a second priority, and the first HARQ-ACK codebook may have a higher priority than the second HARQ-ACK codebook, although the scope of the embodiments is not limited in this respect. In these embodiments, the processing circuitry may be configured to decode a first downlink control information (DCI) format that includes a scheduling grant for a first physical downlink shared channel (PDSCH). The first DCI format may indicate the first priority for HARQ-ACK information for the first PDSCH. The processing circuitry may also decode a second DCI format that include a scheduling grant for a second PDSCH. The second DCI format may indicate the second priority for HARQ-ACK information for the second PDSCH. The processing circuitry may also be configured to multiplex high-priority (HP) HARQ-ACK bits corresponding to the first codebook with low-priority (LP) HARQ-ACK bits corresponding to the second codebook onto a physical uplink control channel (PUCCH) transmission to a gNode B (gNB). In these embodiments, the processing circuitry may be configured to encode the HP HARQ-ACK bits with a first maximum code rate (maxCodeRate) and encode the LP HARQ-ACK bits with a second maximum code rate, In these embodiments, the first and second maximum code rates are configured to the UE via RRC signalling. In some embodiments, the processing circuitry comprises may comprise baseband processor.

Some embodiments are directed to a gNodeB (gNB) configured for operation in a fifth-generation new radio (5G NR) system. In these embodiments, the gNB may generate signalling to configure a user equipment (UE) with a first hybrid automatic repeat request acknowledge (HARQ-ACK) codebook and a second HARQ-ACK codebook. The codebooks may have different priorities. The first HARQ-ACK codebook may have a first priority, the second HARQ-ACK codebook having a second priority, and the first HARQ-ACK codebook may have a higher priority than the second HARQ-ACK codebook although the scope of the embodiments is not limited in this respect. In these embodiments, the gNB may encode a first downlink control information (DCI) format for transmission to the UE. The first DCI format may include a scheduling grant for a first physical downlink shared channel (PDSCH) and may indicate the first priority for HARQ-ACK information for the first PDSCH. In these embodiments, the gNB may also encode a second DCI format for transmission to the UE. The second DCI format may include a scheduling grant for a second PDSCH. The second DCI format may indicate the second priority for HARQ-ACK information for the second PDSCH.

In these embodiments, the gNB may decode a physical uplink control channel (PUCCH) received from the UE containing high-priority (HP) HARQ-ACK bits corresponding to the first codebook multiplexed with low-priority (LP) HARQ-ACK bits corresponding to the second codebook. In these embodiments, the HP HARQ-ACK bits may be encoded with a first maximum code rate (maxCodeRate) and the LP HARQ-ACK bits may be encoded with a second maximum code rate. The first and second maximum code rates may be configured to the UE via RRC signalling. In these embodiments, the HP HARQ-ACK bits and the LP HARQ-ACK bits may be separately encoded when the number of HARQ-ACK bits is more than two.

In some embodiments, the gNB may encode PUCCH resource configuration information for transmission to the UE. The PUCCH resource configuration information may indicate a max code rate for a configured PUCCH formats.

In some embodiments, the gNB may encode a first PUCCH resource configuration information (PUCCH-Config) and a second PUCCH-Config for transmission to the UE. The first PUCCH-Config may indicate the first maximum code rate for a configured PUCCH format and the second PUCCH-Config may indicate the second maximum code rate for the same configured PUCCH format. These embodiments as wells as others are discussed in more detail below.

Among other things, embodiments of the present disclosure are directed to the multiplexing of high and low priority uplink control information (UCI) bits. For example, some embodiments may relate to multiplexing low and high priority UCI bits in a PUCCH. Embodiments of the present disclosure may help enhance system spectral efficiency and scheduling flexibility.

This disclosure proceeds with a brief overview of different types of UCI, corresponding priorities, and existing procedure of UCI transmission and multiplexing into a PUCCH according to Rel-15 and Rel-16 specifications. Terminologies/words in Italic fonts indicate higher layer parameter/configurations, unless otherwise specified.

UCI types reported in a PUCCH include HARQ-ACK information, SR, LRR, and CSI. UCI bits include HARQ-ACK information bits, if any, SR information bits, if any, link recovery request (LRR) information bit, if any, and CSI bits, if any. The HARQ-ACK information bits correspond to a HARQ-ACK codebook. For the present disclosure, any reference to SR is applicable for SR and/or for LRR. Discussed embodiments can apply to any duplexing system such as FDD, TDD, licensed or unlicensed operation, carrier aggregation/dual connectivity scenarios unless mentioned otherwise.

The examples/embodiments below consider multiplexing of HARQ-ACKs of different priority. In particular, we focus on multiplexing of one or more HARQ-ACKs based on a first codebook and one or more HARQ-ACKs based on a second codebook, where first codebook is associated with high priority and second codebook is associated with low priority and for the two codebooks, following options are possible one is slot-based and one is sub-slot-based.

Both are slot-based.

Both are sub-slot-based

Here, slot or sub-slot based implies PUCCH resource for HARQ transmission based on a codebook that spans a slot or sub-slot, respectively. For a given numerology, slot occupies 14 symbols where a sub-slot duration is less than a slot, e.g., can be within 1 symbol to 13 symbols. A sub-slot may not cross slot boundary.

A UE may be configured with one or more PUCCH resource sets for transmission of HARQ-ACK information, where each PUCCH resource set includes a number of PUCCH resources, e.g., 16, where each resource corresponds to a PUCCH format, a first symbol, a duration, a PRB offset $RB_{BWP}^{offset}$, and a cyclic shift index set for a PUCCH transmission (more detail list is provided below). Depending on payload of HARQ-ACK information, a suitable PUCCH resource set is identified. Reed-muller or Polar codes can be used for multiplexed HARQ-ACK transmission. Choice of channel code maybe predefined based on payload (such as up to 11 bits, Reed-muller codes used) or can be dynamically signaled or semi-statically configured if UE supports the capability.

A PUCCH resource includes the following parameters:
a PUCCH resource index provided by pucch-ResourceId
an index of the first PRB prior to frequency hopping or for no frequency hopping by startingPRB, if a UE is not provided useInterlacePUCCH-PUSCH in BWP-UplinkDedicated
an index of the first PRB after frequency hopping by secondHopPRB, if a UE is not provided useInterlacePUCCH-PUSCH in BWP-UplinkDedicated
an indication for intra-slot frequency hopping by intraSlotFrequencyHopping, if a UE is not provided useInterlacePUCCH-PUSCH in BWP-UplinkDedicated
an index of a first interlace by interlace0, if a UE is provided useInterlacePUCCH-PUSCH in BWP-UplinkDedicated
if provided, an index of a second interlace by interlace 1, if a UE is provided useInterlacePUCCH-PUSCH in BWP-UplinkDedicated
an index of an RB set by rb-SetIndex, if a UE is provided useInterlacePUCCH-PUSCH in BWP-UplinkDedicated
a configuration for a PUCCH format provided by format A UE can be configured up to four sets of PUCCH resources. A PUCCH resource set is provided by PUCCH-ResourceSet and is associated with a PUCCH resource set index provided by pucch-ResourceSetId, with a set of PUCCH resource indexes provided by resourceList that provides a set of pucch-ResourceId used in the PUCCH resource set, and with a maximum number of UCI information bits the UE can transmit using a PUCCH resource in the PUCCH resource set provided by maxPayloadSize. For the first PUCCH resource set, the maximum number of UCI information bits is 2. A maximum number of PUCCH resource indexes for a set of PUCCH resources is provided by maxNrofPUCCH-ResourcesPerSet. The maximum number of PUCCH resources in the first PUCCH resource set is 32 and the maximum number of PUCCH resources in the other PUCCH resource sets is 8.

PUCCH resource set determination based on payload can be as follows. If the UE transmits $O_{UCI}$ UCI information bits, that include HARQ-ACK information bits, the UE determines a PUCCH resource set to be
a first set of PUCCH resources with pucch-ResourceSetId=0 if $O_{UCI} \leq 2$ including 1 or 2 HARQ-ACK information bits and a positive or negative SR on one SR transmission occasion if transmission of HARQ-ACK information and SR occurs simultaneously, or
a second set of PUCCH resources with pucch-ResourceSetId=1, if provided by higher layers, if $2<O_{UCI} \leq N_2$ where $N_2$ is equal to maxPayloadSize if maxPayloadSize is provided for the PUCCH resource set with pucch-ResourceSetId=1; otherwise $N_2$ is equal to 1706, or
a third set of PUCCH resources with pucch-ResourceSetId=2, if provided by higher layers, if $N_2<O_{UCI} \leq N_3$ where $N_3$ is equal to maxPayloadSize if maxPayloadSize is provided for the PUCCH resource set with pucch-ResourceSetId=2; otherwise $N_3$ is equal to 1706, or
a fourth set of PUCCH resources with pucch-ResourceSetId=3, if provided by higher layers, if $N_3<O_{UCI} \leq \mathbf{1706}$.

In this disclosure, it is assumed that if a UE is configured with two codebooks, codebooks are configured/associated with different priority. For example, if first (second) codebook is indicated for use of HARQ-ACK transmission, it is assumed of priority index 0, e.g., low priority (priority index 1, e.g., high priority). Indication of which codebook to use can be conveyed by an explicit indication in a field in a DCI format providing DL scheduling grant. For a PUCCH transmission with HARQ-ACK information corresponding to a SPS PDSCH reception or a SPS PDSCH release, a UE determines a priority index from higher layer parameter harq-CodebookID, if provided, per SPS PDSCH configuration. Below, multiplexing HARQ-ACKs based on two HARQ-ACK codebooks and multiplexing two HARQ-ACK codebooks maybe used interchangeably and have similar meaning. Moreover, the UE is provided first and second for each of {PUCCH-Config, UCI-OnPUSCH, PDSCH-code-BlockGroupTransmission} by {PUCCH-ConfigurationList, UCI-OnPUSCH-ListDCI-0-1, PDSCH-CodeBlockGroup-TransmissionList} or {PUCCH-ConfigurationList, UCI-On-PUSCH-ListDCI-0-2, PDSCH-CodeBlockGroupTransmissionList}, respectively, for use with the first and second HARQ-ACK codebooks, respectively.

If in an active DL BWP a UE monitors PDCCH either for detection of DCI format 0_1 and DCI format 1_1 or for detection of DCI format 0_2 and DCI format 1_2, a priority index can be provided by a priority indicator field. If a UE indicates a capability to monitor, in an active DL BWP, PDCCH for detection of DCI format 0_1 and DCI format 1_1 and for detection of DCI format 0_2 and DCI format 1_2, a DCI format 0_1 or a DCI format 0_2 can schedule a PUSCH transmission of any priority and a DCI format 1_1 or a DCI format 1_2 can schedule a PDSCH reception and trigger a PUCCH transmission with corresponding HARQ-ACK information of any priority.

A UE is configured by maxCodeRate a code rate for multiplexing HARQ-ACK, SR, and CSI report(s) in a PUCCH transmission using PUCCH format 2, PUCCH format 3, or PUCCH format 4. CSI reports(s) may comprise Part 1 and Part 2. Part 2 CSI report, if exists, is separately encoded from HARQ-ACK, SR, and Part 1 CSI report for multiplexing onto a PUCCH.

Different Methods of Multiplexing of LP and HP HARQ-ACKs by Separate Coding

Method 1

In Rel-15 and Rel-16 procedures, UE does not multiplex UCI types of different priorities into a PUCCH. In the event of an overlap of HARQ-ACKs of priority index 0 and 1, UE would drop HARQ-ACK with priority index 0. A UE following Rel-17 procedure can be allowed to multiplex HARQ-ACKs of different priorities into a PUCCH. A first set of HARQ-ACK bits corresponding to first codebook (of priority index 0) and a second set of HARQ-ACK bits corresponding to second codebook (of priority index 1) can be separately encoded and multiplexed into a PUCCH. According to Rel-15 and Rel-16 procedures, UE is configured with a single maxCodeRate which is applied for UCI multiplexing into a PUCCH for PUCCH formats 2, 3, and 4. For a UE following Rel-17, following scenarios may occur:
   HARQ-ACK with or without multiplexing with SR is transmitted in a PUCCH, where both HARQ-ACK and SR is priority index 1.
   HARQ-ACK with or without SR and CSI reports (if present) are multiplexed and transmitted in a PUCCH, where both HARQ-ACK and SR is priority index 0.
   HARQ-ACK with or without multiplexing with SR, where both HARQ-ACK and SR is of priority index 1, and HARQ-ACK of priority index 0 are separately encoded and multiplexed onto a PUCCH.
   HARQ-ACK with or without multiplexing with SR, where both HARQ-ACK and SR is of priority index 0, and HARQ-ACK of priority index 1 are separately encoded and multiplexed onto a PUCCH.

A single value of maxCodeRate may not result in resource efficient multiplexing for the above scenarios. Since the reliability of HARQ-ACK with/without SR of priority index 1 needs to be protected, appropriate amount of resource may need to be budgeted, e.g., by choosing a low maxCodeRate for the UE along with proper selection of PUCCH resource. On the other hand, always choosing a conservative maxCodeRate may cause HARQ-ACK bits of priority index 0 to be dropped (partially or fully) in most occasions, since it is expected that payload of HARQ-ACK bits of priority index 0 is larger than that of HARQ-ACK bits of priority index 1.

In one embodiment, a set of N≥1 maxCodeRate values can be configured to the UE, such as by higher layer RRC signaling. In one example, UE may report up to M≥1 maxCodeRate values via capability signaling. In one example, a set of N=3 maxCodeRate values are configured. Such as a first value is used for multiplexing according to scenario 1, a second value is used for multiplexing according to scenario 2, and a third value is used when multiplexing across different priority UCIs take place, such as scenario 3 and 4. In this example, UE would apply appropriate maxCodeRate depending on scenario. In one example, this can be applicable when UCI multiplexing uses PUCCH format 2, 3, or 4. In one example, first and second value may be the same, e.g., same maxCodeRate is used for multiplexing UCI bits of a given priority index regardless of the priority index value.

In another example of the embodiment, the maxCodeRate can be configured as a parameter in the PUCCH resource configuration. In this case, one or more PUCCH resources within a PUCCH resource set may include this parameter in the configuration. Alternatively, maxCodeRate can be configured per PUCCH resource set. In this case, for all PUCCH resources within a given PUCCH resource set would use the maxCodeRate associated with the PUCCH resource set for UCI multiplexing onto PUCCH. As a further extension, maxCodeRate can be configured per PUCCH format. In one example, different PUCCH formats including PUCCH format 2, 3 or 4 may be configured with different maxCodeRate values.

In another example of the embodiment, a set of N≥1 maxCodeRate values can be configured to the UE, such as by higher layer RRC signaling and a DCI format scheduling a PDSCH and triggering a corresponding HARQ-ACK feedback for a given PHY priority may indicate the applicable maxCodeRate if the HARQ-ACK feedback is expected to be multiplexed in a PUCCH with UCI with different PHY priority. In an example of the embodiment, the DCI format can be the one that triggers the transmission of the HP HARQ-ACK.

In another embodiment, if UE identifies a resource for PUCCH transmission based on PUCCH format 2 (such as based on PUCCH resource indicator field and chosen PUCCH resource set for a given UCI payload), it may be indicative of dropping of LP HARQ-ACK and/or SR bits. In other words, PUCCH format 2 may not be used for multiplexing UCI bits across different priorities, and only PUCCH formats 3 or 4 may be used to carry a multiplexed set of UCI bits across different PHY priorities.

In another embodiment, separate encoding of HARQ-ACK bits of priority index 1 and 0 and multiplexing onto a PUCCH is only supported using PUCCH formats 3 and 4, when number of HARQ-ACK and/or SR bits for priority indices 0 and 1 are more than 2.

In yet another embodiment, the procedure of separate coding and multiplexing can be described as follows:

UE has at least HARQ-ACK bits of priority index 1 and HARQ-ACK bits of priority index 0 to transmit, and may have optionally SR of either priority index 0 or 1 and/or CSI reports to transmit and the UE determines a PUCCH resource associated with second PUCCH-config and PUCCH format 3 or PUCCH format 4, after dropping CSI reports, where the UE determines the PUCCH resource using the PUCCH resource indicator field in a last of a number of DCI formats, at least including those that scheduled PDSCH(s) with respect to HARQ-ACK of priority index 1, with a value of a PDSCH-to-HARQ feedback timing indicator field indicating a same slot or a sub-slot or a sub-slot overlapping with a slot, where UE would transmit HARQ-ACK bits of priority index 0, for the PUCCH transmission, from a PUCCH resource set provided to the UE for HARQ-ACK transmission.

The UE determines the PUCCH resource set based on the criteria discussed above $O_{UCI}$ UCI bits, where $O_{UCI}$ includes HARQ-ACK bits of priority index 0 (such as $O_{ACK,0}$) and 1 (such as $O_{ACK,1}$), and SR of priority index 0 (such as $O_{SR,0}$) or 1 (such as $O_{SR,1}$), if any.

In one example, assuming SR bits are not present, $$O_{ACK,0} + O_{CRC,0} \leq \left(M_{RB}^{PUCCH} \cdot N_{sc,ctrl}^{RB} \cdot N_{symb-UCI}^{PUCCH} - \left\lceil \frac{(O_{ACK,1} + O_{CRC,1})}{Q_m \cdot r_c} \right\rceil \right) \cdot Q_m r_c$$

holds, then UE transmits $O_{ACK,0}$ bits together with $O_{ACK,1}$, where $O_{CRC,0}$ and $O_{CRC,1}$ are the number of CRC bits corresponding to $O_{ACK,0}$ bits and $O_{ACK,1}$ bits, respectively, and $r_c$ is the coding rate obtained based on one or more of the embodiments/examples described above. Here, it is implied that code rate refers to the maxCodeRate in the examples/embodiments discussed above. If the condition does not hold, UE only transmits $O_{ACK,1}$ bits within the resources given by $M_{RB}^{PUCCH}, N_{sc,ctrl}^{RB}, N_{symb-UCI}^{PUCCH}$. In one variation of the example, UE determines a number of PRBs $M_{RB,min}^{PUCCH}$ for the PUCCH transmission to be the minimum number of PRBs, that is smaller than or equal to a number of PRBS $M_{RR}^{PUCCH}$ and starts from the first PRB from the number of PRBs, that results to $$O_{ACK,1} + O_{CRC,1} \leq M_{RB,min}^{PUCCH} N_{sc,ctrl}^{RB} N_{symb-UCI}^{PUCCH} Q_m r_c$$

and, if $M_{RR}^{PUCCH} > 1$, $O_{ACK,1} + O_{CRC,1} > (M_{RB,min}^{PUCCH} - 1) N_{sc,ctrl}^{RB} N_{symb-UCI}^{PUCCH} Q_m r_c$.

Here, $M_{RR}^{PUCCH}$ is a number of PRBs for PUCCH format 2, or PUCCH format 3, or PUCCH format 4, respectively, where $M_{RR}^{PUCCH}$ is provided by nrofPRBs in PUCCH-format2 for PUCCH format 2 or by nrofPRBs in PUCCH-format3 for PUCCH format 3, and $M_{RR}^{PUCCH} = 1$ for PUCCH format 4.

$N_{sc,ctrl}^{RB} = N_{sc}^{RB} - 4$ for PUCCH format 2 or, if the PUCCH resource with PUCCH format 2 includes an orthogonal cover code with length $N_{SF}^{PUCCH,2}$ provided by occ-Length, $N_{sc,ctrl}^{RB} = (N_{sc}^{RB} - 4)/N_{SF}^{PUCCH,2}$, $N_{sc,ctrl}^{RB} = N_{sc}^{RB}$ for PUCCH format 3 or, if the PUCCH resource with PUCCH format 3 includes an orthogonal cover code with length $N_{SF}^{PUCCH,3}$ provided by occ-Length, $N_{sc,ctrl}^{RB} = N_{sc}^{RB}/N_{SF}^{PUCCH,3}$, and $N_{sc,ctrl}^{RB} = N_{sc}^{RB}/N_{SF}^{PUCCH,4}$ for PUCCH format 4, where $N_{sc}^{RB}$ is a number of subcarriers per resource block $N_{symb-UCI}^{PUCCH}$ is equal to a number of PUCCH symbols $N_{symb}^{PUCCH,2}$ symb for PUCCH format 2 provided by nrofSymbols in PUCCH-format2. For PUCCH format 3 or for PUCCH format 4, $N_{symb-UCI}^{PUCCH}$ is equal to a number of PUCCH symbols $N_{symb}^{NPUCCH,3}$ for PUCCH format 3 or equal to a number of PUCCH symbols $N_{symb}^{PUCCH,4}$ for PUCCH format 4 provided by nrofSymbols in PUCCH-format3 or nrofSymbols in PUCCH-format4, respectively, after excluding a number of symbols used for DM-RS transmission for PUCCH format 3 or for PUCCH format 4, respectively $Q_m = 1$ if pi/2-BPSK is the modulation scheme and $Q_m = 2$ if QPSK is the modulation scheme as indicated by pi2BPSK for PUCCH format 3 or PUCCH format 4. For PUCCH format 2, $Q_m = 2$ In one example, the rate matching output sequence length or number of rate matched bits for each of HARQ-ACK of priority index 1 and 0 can be obtained as follows:

$$E_{ACK,1} = \min(E_{tot}, \lceil O_{ACK,1} + O_{CRC,1})/r_c/Q_m \rceil \cdot Q_m)$$

$$E_{ACK,0} = E_{tot} - E_{ACK,1}$$

where $E_{tot}$ is the total rate matching output sequence length for a given PUCCH format and modulation order.

In one variation of the above example, $O_{ACK,0}$ bits can be divided into N parts such as $O_{ACK,0} = \sum_{i=1}^{N} O_{ACK,0}^{i}$, and if $$\sum_{i=1}^{J} O_{ACK,0}^{i} + O_{CRC,0}^{J} \leq \left(M_{RB}^{PUCCH} \cdot N_{sc,ctrl}^{RB} \cdot N_{symb-UCI}^{PUCCH} - \left\lceil \frac{(O_{ACK,1} + O_{CRC,1})}{Q_m \cdot r_c} \right\rceil \right) \cdot Q_m r_c$$

and $$\sum_{i=1}^{J+1} O_{ACK,0}^{i} + O_{CRC,0}^{J+1} > \left(M_{RB}^{PUCCH} \cdot N_{sc,ctrl}^{RB} \cdot N_{symb-UCI}^{PUCCH} - \left\lceil \frac{(O_{ACK,1} + O_{CRC,1})}{Q_m \cdot r_c} \right\rceil \right) \cdot Q_m r_c$$

holds, then UE selects the first J parts, where $N \geq J \geq 1$, of HARQ-ACK bits of priority index 0 and transmit together with $O_{ACK,1}$, where $O_{CRC,0}^{J}$ and $O_{CRC,0}^{J+1}$ are the number of CRC bits calculated for first J and first J+1 parts of $O_{ACK,0}$ bits, respectively, and $r_c$ is the code rate obtained based on one or more of the embodiments/examples described above. UE drops the other N-J parts of HARQ-ACK bits of priority index 0, else, UE drops all of N parts of HARQ-ACK bits of priority index 0. In one option, value of N, such as N=1, 2, 3, . . . etc., maybe configured by higher layer RRC signaling.

In another variation of the above example, $O_{ACK,0}$ bits can be compressed to $O_{ACK,0}^{k}$ bits, where $O_{ACK,0}^{k} < O_{ACK,0}^{k+1}$ and $O_{ACK,0}^{k}$ bits can be obtained from $O_{ACK,0}$ bits by applying a compression factor $\rho_k$, k=1, . . . , M, e.g., there can be M compression factors configured by higher layer RRC signaling, and if $$O_{ACK,0}^k + O_{CRC,0}^k \leq$$

$$\left( M_{RB}^{PUCCH} \cdot N_{sc,ctrl}^{RB} \cdot N_{symb-UCI}^{PUCCH} - \left\lceil \frac{(O_{ACK,1} + O_{CRC,1})}{Q_m \cdot r_c} \right\rceil \right) \cdot Q_m r_c$$

and $$O_{ACK,0}^{k+1} + O_{CRC,0}^{k+1} >$$

$$\left( M_{RB}^{PUCCH} \cdot N_{sc,ctrl}^{RB} \cdot N_{symb-UCI}^{PUCCH} - \left\lceil \frac{(O_{ACK,1} + O_{CRC,1})}{Q_m \cdot r_c} \right\rceil \right) \cdot Q_m r_c$$

holds, then UE selects $O_{ACK,0}^k$ bits after applying compression factor $\rho_k$ on HARQ-ACK bits of priority index 0 and transmit together with $O_{ACK,1}$, where $O_{CRC,0}^k$ and $O_{CRC,0}^{k+1}$ are the number of CRC bits corresponding to compression factor k and k+1 applied on $O_{ACK,0}$ bits, respectively, and $r_c$ is obtained based on one or more of the embodiments/examples described above. UE drops the other parts of HARQ-ACK bits of priority index 0, else, UE drops all of HARQ-ACK bits of priority index 0.

In the above examples, if SR bits are present for either priority index 0 or 1, $O_{ACK,0}(O_{ACK,1})$ would be replaced by $O_{ACK,0}+O_{SR,0}(O_{ACK,1}+O_{SR,1})$ bits and correspondingly CRC bits would refer to the updated payload bits. Further, in case the LP UCI needs to be dropped and SR bit(s) may be included as part of the LP UCI payload, then the SR bits may be considered first for potential dropping, before HARQ-ACK bits are dropped.

In one example, in the event of $O_{ACK,0}$ or $O_{ACK,1}$ bits being less than 11, no CRC bits may be appended and RM coding is used, e.g., $O_{CRC,0}=0$ or $O_{CRC,1}=0$ If DCI or higher layer configuration indicates the UE to drop HARQ-ACK bits of priority index 0, and $O_{ACK,1}+O_{SR,1}+O_{CRC,1} \leq M_{RB}^{PUCCH} N_{sc,ctrl}^{RB} N_{symb-UCI}^{PUCCH} Q_m r'_c$, where $r'_c$ is the coding rate obtained based on one or more of the embodiments/examples described above and $O_{CRC,1}$ is a number of CRC bits, if any, for encoding HARQ-ACK and SR (if present) bits of priority index 1, the UE transmits the HARQ-ACK bits and SR bits (if any) by selecting the minimum number $M_{RB,min}^{PUCCH}$ of PRBs from the PUCCH $M_{RR}^{PUCCH}$ BUCCH PRBs satisfying $$O_{ACK,1}+O_{SR,1}+O_{CRC,1} \leq M_{RB,min}^{PUCCH} N_{sc,ctrl}^{RB} N_{symb-UCI}^{PUCCH} Q_m r'_c.$$

In one embodiment, mapping of UCI bits may be such that more critical bits such as HARQ-ACK bits of priority index 1, with or without SR of priority index 1, are mapped close to DMRS locations, while less critical UCI such as HARQ-ACK bits of priority index 0 are mapped in the remaining positions.

Figure 2:
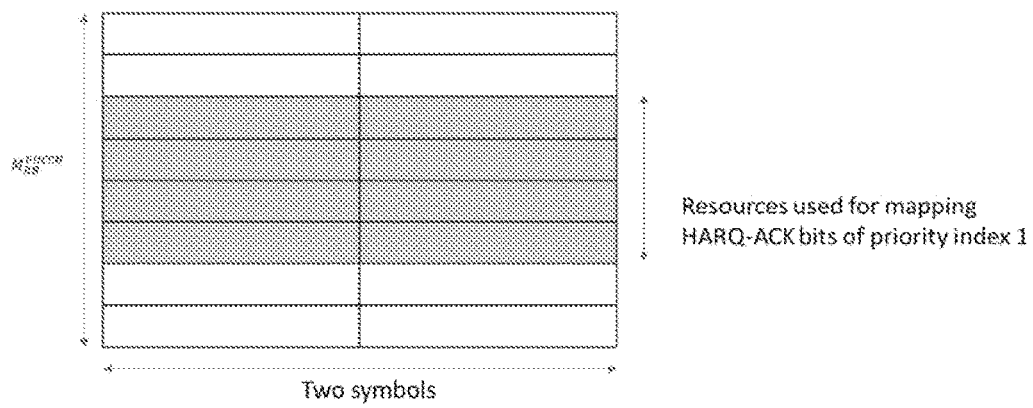
FIG. 2 illustrates the mapping of HARQ-ACK bits of priority index 1 to resource elements (REs) near the center of a physical uplink control channel (PUCCH) bandwidth and the mapping of HARQ-ACK bits of priority index 0 to other RBs, in accordance with some embodiments.

In one embodiment, the above considerations applied to PUCCH format 3 or 4 can also be applied if PUCCH format 2 is used. In Rel-15 or Rel-16 procedures, only joint coding is supported for PUCCH format 2, where UCI bits and DMRS are frequency division multiplexed in a symbol. Since reliability requirements for HARQ-ACK bits of priority index 1 can be much higher than HARQ-ACK bits of priority index 0 and channel estimation performance at the edge of the PUCCH BW can be inferior compared to center of the BW, resources at the center of the BW may be more suitable for transmission of HARQ-ACK bits of priority index 1. In one example of the embodiment, mapping for UCI bits with PUCCH format 2 is such that resource elements near the center of the PUCCH BW are used for mapping HARQ-ACK bits of priority index 1, with or without SR of priority index 1. In an extension to the example, if N REs are used to fit HARQ-ACK bits transmission of priority index 1 among $M_{RB}^{PUCCH}$. $N_{sc,ctrl}^{RB} \cdot N_{symb-UCI}^{PUCCH}$ REs available in the PUCCH, including DMRS, then REs from $M_{RB}^{PUCCH} \cdot N_{sc,ctrl}^{RB}/2 - \lfloor N/2 \rfloor$ to $M_{RB}^{PUCCH} \cdot N_{sc,ctrl}^{RB}/2 + \lceil N/2 \rceil$ REs or from $M_{RB}^{PUCCH} \cdot N_{sc,ctrl}^{RB}/2 - \lceil N/2 \rceil$ to $M_{RB}^{PUCCH} \cdot N_{sc,ctrl}^{RB}/2 + \lfloor N/2 \rfloor$ can be used for mapping, assuming REs in a symbol are counted from edge of BW, excluding DMRS REs. Rest of the REs are used for HARQ-ACK bits of priority index 0. An example is shown in FIG. 2, where in a 2 symbol PUCCH resource, REs near the center of the BW is used for mapping HARQ-ACK bits of priority index 1. FIG. 2 illustrates that HARQ-ACK bits of priority index 1 can be mapped near the center of the PUCCH BW of $M_{RR}^{PUCCH}$ PRBs (highlighted RBs), and rest of the RBs, if any, are used up by HARQ-ACK bits of priority index 0.

In another example related to the above embodiment, the mapping of the UCI bits of priority 1 can start from the center REs and continue to edge REs, e.g., from center RE, to center RE+1, to center RE−1, to center RE+2, to center RE−2, and so on.

In one embodiment, if a PUCCH resource is determined for multiplexing of the HARQ-ACK bits of different priorities using a PUCCH format, e.g., format 3, for which frequency hopping is configured, HARQ-ACK bits of priority index 1 maybe mapped to the first hop, whereas HARQ-ACK bits of priority index 0 maybe mapped to the second hop. In another example, for meeting higher reliability requirement, encoded HARQ-ACK bits of priority index 1 are mapped in both hops, e.g. in interleaved manner, whereas HARQ-ACK bits of priority index 0 maybe mapped to one of the hops only. In one example, UE may be provided with a higher layer RRC signaling to provide such configuration in the event of a multiplexing.

In another embodiment, same multiplexing mechanism as defined for UCI multiplexing on PUSCH can be applied for mapping UCI bits with different priorities into PUCCH format 2, by excluding the DMRS REs in the PUCCH format 2. More specifically, the UCI including HARQ-ACK bits with priority index 1 are mapped first to REs in a distributed manner with distance 'd' determined as following, excluding DMRS REs in each OFDM symbol:

d=1, if the number of unmapped modulated symbols for that UCI at the beginning OFDM symbol i is larger or equal to the number of available REs in this OFDM symbol.

d=floor(number available REs on i-th OFDM symbol/the number of unmapped modulated symbols for that UCI at the beginning OFDM symbol i)

Further, the remaining resource is allocated for the UCI including HARQ-ACK bits with priority index 0.

In one embodiment, HARQ-ACK bits of priority index 1 and index 0 are separately encoded and mapped to REs that are interleaved within the PUCCH resource.

Method 2

In one embodiment, two PUCCH resource parts can be identified within the PUCCH resource determined by the UE for multiplexing and transmission HARQ-ACK bits of different priorities. In one example, a first and a second maxCodeRate are used for transmission of HARQ-ACK bits of priority index 1 and 0 in the first PUCCH resource part and second resource part, respectively. In an example, multiple values of maxCodeRate may be configured via higher layers and a DCI format, scheduling a PDSCH and triggering a corresponding HARQ-ACK feedback for a given PHY priority may indicate the applicable pair of maxCodeRate values if the HARQ-ACK feedback is expected to be multiplexed with UCI with different PHY priorities in a PUCCH with two identifiable PUCCH resource parts. In a further example, the DCI format can be the one that triggers the transmission of the HP HARQ-ACK.

Figure 3:
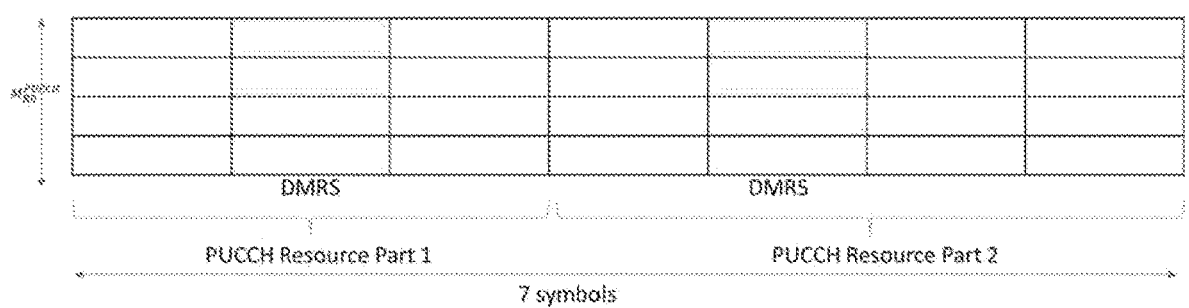
FIG. 3 illustrates the splitting of a PUCCH resource in time to obtain part 1 and part 2 for carrying HARQ-ACK bits of priority index 1 and HARQ-ACK bits of priority index 0, respectively, in accordance with some embodiments.

In one example, each PUCCH resource part is self-contained with DMRS symbols. This may facilitate independent and early decoding of HARQ-ACK bits in PUCCH resource part, such as PUCCH resource part 1 may comprise resources that precede resource part 2 in time. An example is shown in FIG. 3, where two PUCCH resource parts are obtained by splitting the PUCCH resource in TDM manner. PUCCH part 1 may carry HARQ-ACK bits of priority index 1, whereas part 2 may carry bits of priority index 0.

In one example, the resource split into two resource parts or the number of PRBs, number of symbols or in general, number of REs for each resource part may depend on one or more of: payload of HARQ-ACK and/or SR bits of priority index 0, payload of HARQ-ACK and/or SR bits of priority index 1, total payload, configured maxCodeRate values to be used for each resource parts. In one example, number of PRBs, number of symbols, or in general, number of REs can be upper bounded by a configurable limit for each resource part. Accordingly, a single PUCCH resource can be selected based on PUCCH config associated with HP HARQ-ACK codebook. The selected PUCCH resource can then be divided into two parts, where split can be in PRBs and/or symbols. In some examples, the two resource parts may have different number of REs in frequency domain. Moreover, for a given resource part, number of REs over different symbols can be different. For example, for a 5 symbol PUCCH resource, UCI carrying symbols are 3, out of which 2 and half symbols are used by part 1, and half of a symbol is used for part 2. In another example, out of 3 UCI carrying symbols, Part 1 includes $1^{st}$ symbol and half of second symbol, whereas part 2 includes other half of second symbol and third symbol.

In one example, a set of pair of maxCodeRate values can be configured, and depending on payload of HARQ-ACK bits, a pair of maxCodeRate values is chosen, which in one example, may result in a certain resource split of the PUCCH resource. In one example, maxCodeRate is the code rate used for encoding and mapping the bits into corresponding resource parts, e.g., all of the resources in respective resource parts are used for HARQ-ACK bits transmission. In such case, for each resource part, rate matching output sequence length after coding is same as total possible rate matching output sequence possible in the resource. In one example, at least for the PUCCH resource part 2 where HARQ-ACK and/or SR bits of priority index 0 is mapped, partial dropping or compression can still be considered if total payload of HARQ-ACK and/or SR bits of priority index 0 cannot be fit into the resource part, following similar mechanisms described in Method 1. In a further example, the PUCCH resource part corresponding to UCI bits with priority index 1 is in the same symbols as, or at least ends no later than the end of: the original PUCCH resource indicated for the UCI with priority index 1. In one example, pair of maxCodeRate values can be configured per PUCCH format for a PUCCH configuration, where the two values of the pair correspond to maxCodeRate used for encoding HARQ-ACK bits of priority 0 and 1 separately.

In an embodiment, for the above options for Method 2, each of the PUCCH resource parts may be considered independently for any potential cancelation due to one or more of: overlap with any other higher priority channels/signals, conflicts with link directions including dynamic slot format indication (SFI) via DCI format 2_0, UL cancelation indication (UL CI) via DCI format 2_4, etc. That is, if one of the PUCCH resource parts is impacted, the other PUCCH resource part may still be expected to be transmitted by the UE. In an example of the embodiment, separate consideration of potential cancelation of a PUCCH resource part is limited only to scenarios when the two PUCCH resource parts are mapped to different (non-overlapping) symbols.

In one example, with separate maxCodeRate configuration for separately encoding HARQ-ACKs of priority 0 and 1, rate matching output sequence length can be obtained as $$E_{ACK,1} = \min(E_{tot}, \lceil (O_{ACK,1} + O_{CRC,1})/r_c^1/Q_m \rceil \cdot Q_m),$$

$$E_{ACK,0} = \min(E_{tot} - E_{ACK,1}, \lceil (O_{ACK,0} + O_{CRC,0})/r_c^0/Q_m \rceil \cdot Q_m),$$

for HARQ-ACK bits of priority 1 and 0 respectively, where $r_c^1$ and $r_c^0$ refer to maxCodeRate used for encoding HARQ-ACK bits of priority 1 and 0. CSI is dropped if CSI is present and would be multiplexed onto the PUCCH that will include HARQ-ACK of priority 1.

Alternatively, combined rate matching output sequence length can be obtained as $$E_{UCI} = \min(E_{tot}, \lceil (O_{ACK,1} + O_{CRC,1})/r_c^1/Q_m \rceil \cdot Q_m + \lceil (O_{ACK,0} + O_{CRC,0})/r_c^0/Q_m \rceil \cdot Q_m)$$

In one example, UE would determine PUCCH resource with PUCCH format 3 or 4 when UE would multiplex HARQ-ACK bits of priority 1 and 0 with corresponding maxCodeRates $r_c^1$ and $r_c^0$, respectively, as UE determines the PUCCH resource using the PUCCH resource indicator field in the DCI that triggered HARQ-ACK of priority 1 from a PUCCH resource set UE determines the PUCCH resource set based on UCI payload $O_{ACK,1} + O_{ACK,0}$ UE determines/selects minimum number $M_{RB,min}^{PUCCH}$ of PRBs from $M_{RR}^{PUCCH}$ PRBs that satisfy $$((O_{ACK,1} + O_{CRC,1})/r_c^1 + (O_{ACK,0} + O_{CRC,0})/r_c^0) \leq M_{RB,min}^{PUCCH} \cdot N_{sc,ctrl}^{RB} \cdot N_{symb\_UCI}^{PUCCH} \cdot Q_m$$

If $O_{ACK,0}$ payload bits cannot be accommodated, then HARQ-ACK bits of priority 0 can be partially dropped, e.g., $O'_{ACK,0} < O_{ACK,0}$ bits can be used instead in the above equation, or alternatively HARQ-ACK bits of priority index 0 can be dropped. In one example, UE can be configured with a set of reference payload sizes to facilitate partitioning, e.g., highest reference payload size (which is less than the actual payload of HARQ-ACK of priority 0) is used that satisfy the resource constraint.

DCI triggering HARQ-ACK of priority index 0 may be less reliable than the DCI triggering HARQ-ACK of priority index 1. Hence, chance of missed detection of the DCI corresponding to HARQ-ACK of priority index 0 is higher, e.g., 1%, compared to that (e.g., 0.001%) of DCI triggering HARQ-ACK of priority index 1. If dynamic or type 2 codebook (cf. TS 38.213) is used, the problem of ambiguity due to missed detection of DCI on HARQ-ACK codebook size corresponding to priority index 0 could impact the reliability of HARQ-ACK transmission of priority index 1, since assumption on number of HARQ-ACK bits of priority 0, PUCCH resource and/or rate matching determination can be different between gNB and UE. For example, UE could only transmit HARQ-ACK bits of priority 1 whereas gNB is expecting multiplexed HARQ-ACK bits of different priorities. In one example, if the DAI bit field in the DCI corresponding to HARQ-ACK bits of priority 0 include total DAI indicator bits in addition to counter DAI bits, then ambiguity is not expected since UE would know the total number of HARQ-ACK bits of priority 0 for the occasion or slot where DCI for HARQ-ACK of priority 0 was received. Total DAI bits may only be present when UE is configured with multiple carriers. For single carrier transmission, there is chance that only counter DAI bits are indicated in the DAI bit field and missing a DCI would cause ambiguity regarding total HARQ-ACK payload until the last occasion, before UE would multiplex HARQ-ACK bits of different priorities. In one option, gNB may configure a reference size for the HARQ-ACK codebook of priority 0 for the UE to assume when multiplexing with HARQ-ACK bits of priority 1 for type 2 codebook. However, assuming a certain reference size for multiplexing can be inefficient as it may result in much larger PUCCH resource selection than what is actually necessary. In one embodiment, there can be a set of reference sizes configured corresponding to the size of HARQ-ACK codebook of priority 0 and the DCI triggering HARQ-ACK of priority 1 may include an identifier of a certain reference size among the configured set of reference sizes for HARQ-ACK type 2 codebook. This could result in more efficient multiplexing of HARQ-ACK bits of different priorities, at least in terms of resource utilization. In one example, even if UE decodes successfully all DCIs corresponding to HARQ-ACK bits of priority 0 that would be multiplexed with HARQ-ACK bits of priority 1, UE may still follow the reference size indicated by the DCI triggering HARQ-ACK bits of priority index 1 to determine the overall HARQ-ACK bits payload.

In an example, such indication is provided to the UE via a new bit-field or based on a re-interpretation of existing bit-fields that is assumed by the UE for DCI format 1_1 or DCI format 1_2 when configured with the HARQ-ACK CB indicator bit-field, and the indication is ignored if the DCI format 1_1 or 1_2 indicates HARQ-ACK CB of priority 0.

In another variation of the embodiment, the DCI format triggering HARQ-ACK of priority 1 may indicate a value that is interpreted as the Counter-DAI or Total-DAI (when configured) corresponding to the latest DCI format scheduling a PDSCH with corresponding HARQ-ACK using HARQ-ACK CB of priority 0 that is expected to be multiplexed in the PUCCH indicated by the DCI triggering HARQ-ACK of priority 1. Further, in this case, for determining the size of the HARQ-ACK codebook of priority 0 a UE may be expected to prioritize the indication in the DCI format triggering HARQ-ACK of priority 1 in case the indicated value does not match with the Counter-DAI or Total-DAI (when configured) value indicated in the latest DCI received by the UE that triggers HARQ-ACK of priority 0 with a PUCCH resource that overlaps with the PUCCH resource indicated by the DCI format triggering HARQ-ACK of priority 1.

Such an approach can avoid the inefficiency of using reference sizes or increased DCI format size (if a wide range of reference sizes is to be indicated from) at the cost of some scheduling restrictions for DCI format(s) triggering HARQ-ACK of priority 0 that may be scheduled after a given DCI format triggering HARQ-ACK of priority 1. However, the restrictions may not be impactful in practice since it would not be typical to schedule many PDSCHs with HARQ-ACK priority 0 to be multiplexed in a PUCCH that is intended to carry HARQ-ACK feedback corresponding to HARQ-ACK CB with priority 1.

Figure 4:
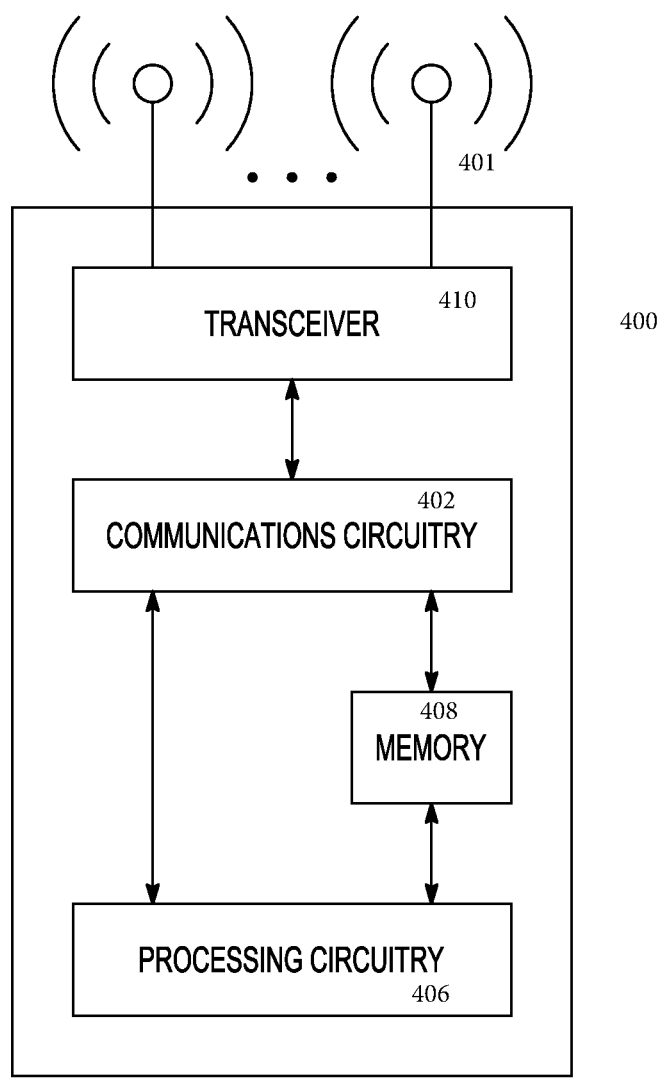
FIG. 4 illustrates a functional block diagram of a wireless communication device, in accordance with some embodiments.

FIG. 4 illustrates a functional block diagram of a wireless communication device, in accordance with some embodiments. Wireless communication device 400 may be suitable for use as a UE or gNB configured for operation in a 5G NR network.

The communication device 400 may include communications circuitry 402 and a transceiver 410 for transmitting and receiving signals to and from other communication devices using one or more antennas 401. The communications circuitry 402 may include circuitry that can operate the physical layer (PHY) communications and/or medium access control (MAC) communications for controlling access to the wireless medium, and/or any other communications layers for transmitting and receiving signals. The communication device 400 may also include processing circuitry 406 and memory 408 arranged to perform the operations described herein. In some embodiments, the communications circuitry 402 and the processing circuitry 406 may be configured to perform operations detailed in the above figures, diagrams, and flows.

In accordance with some embodiments, the communications circuitry 402 may be arranged to contend for a wireless medium and configure frames or packets for communicating over the wireless medium. The communications circuitry 402 may be arranged to transmit and receive signals. The communications circuitry 402 may also include circuitry for modulation/demodulation, upconversion/downconversion, filtering, amplification, etc. In some embodiments, the processing circuitry 406 of the communication device 400 may include one or more processors. In other embodiments, two or more antennas 401 may be coupled to the communications circuitry 402 arranged for sending and receiving signals. The memory 408 may store information for configuring the processing circuitry 406 to perform operations for configuring and transmitting message frames and performing the various operations described herein. The memory 408 may include any type of memory, including non-transitory memory, for storing information in a form readable by a machine (e.g., a computer). For example, the memory 408 may include a computer-readable storage device, read-only memory (ROM), random-access memory (RAM), magnetic disk storage media, optical storage media, flash-memory devices and other storage devices and media.

In some embodiments, the communication device 400 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication device 400 may include one or more antennas 401. The antennas 401 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting device.

In some embodiments, the communication device 400 may include one or more of a keyboard, a display, a non-volatile memory port, multiple antennas, a graphics processor, an application processor, speakers, and other mobile device elements. The display may be an LCD screen including a touch screen.

Although the communication device 400 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication device 400 may refer to one or more processes operating on one or more processing elements.

EXAMPLES

Example 1 may include a method of wireless communication for a fifth generation (5G) new radio (NR) system comprising receiving by a UE, configuration of a first HARQ-ACK codebook or a scheduling request (SR) configuration associated with low physical layer (PHY) priority; receiving by the UE, configuration of a second HARQ-ACK codebook or a scheduling request (SR) configuration associated with high PHY priority; receiving by the UE, a first indication or configuration for a first PDSCH transmission, where the indication identifies corresponding HARQ-ACK transmission is based on first codebook and mapped to a first PUCCH resource, or a first configuration where the configuration identifies corresponding scheduling request (SR) transmission mapped to a first PUCCH resource; receiving by the UE, a second indication or configuration for second PDSCH transmission, where indication identifies corresponding HARQ-ACK transmission is based on second codebook and mapped to a second PUCCH resource that overlaps with first PUCCH resource, or a second configuration where the configuration identifies corresponding scheduling request (SR) transmission mapped to a second PUCCH resource; transmitting by the UE, multiplexed HARQ-ACK and/or SR bits based on two codebooks in a third PUCCH resource based on the configuration of second codebook such that the UCI bits corresponding to each PHY priority are separately encoded and mapped to the third PUCCH resource.

Example 2 may include the method of example 1 or some other example herein, wherein a set of N≥1 maxCodeRate values is configured to the UE, such as by higher layer RRC signaling.

Example 3 may include the method of example 2 or some other example herein, wherein a set of N=3 maxCodeRate values are configured such that a first value is used for multiplexing according to scenario 1, a second value is used for multiplexing according to scenario 2, and a third value is used when multiplexing across different priority UCIs take place, such as scenario 3 and 4, where scenarios 1 through 4 are defined as:
  Scenario 1: HARQ-ACK with or without multiplexing with SR is transmitted in a PUCCH, where both HARQ-ACK and SR is priority index 1.
  Scenario 2: HARQ-ACK with or without SR and CSI reports (if present) are multiplexed and transmitted in a PUCCH, where both HARQ-ACK and SR is priority index 0.
  Scenario 3: HARQ-ACK with or without multiplexing with SR, where both HARQ-ACK and SR is of priority index 1, and HARQ-ACK of priority index 0 are separately encoded and multiplexed onto a PUCCH.
  Scenario 4: HARQ-ACK with or without multiplexing with SR, where both HARQ-ACK and SR is of priority index 0, and HARQ-ACK of priority index 1 are separately encoded and multiplexed onto a PUCCH.

Example 4 may include the method of example 2 or some other example herein, wherein the maxCodeRate is configured as a parameter in the PUCCH resource configuration or is configured per PUCCH resource set.

Example 5 may include the method of example 2 or some other example herein, wherein a set of N≥1 maxCodeRate values is configured to the UE, such as by higher layer RRC signaling, and a DCI format scheduling a PDSCH and triggering a corresponding HARQ-ACK feedback for a given PHY priority may indicate the applicable maxCodeRate if the HARQ-ACK feedback is expected to be multiplexed in a PUCCH with UCI with different PHY priority.

Example 6 may include the method of example 1 or some other example herein, wherein separate encoding of HARQ-ACK bits of priority index 1 and 0 and multiplexing onto a PUCCH is supported using PUCCH formats 3 and 4 only, when number of HARQ-ACK and/or SR bits for priority indices 0 and 1 are more than 2.

Example 7 may include the method of example 1 or some other example herein, wherein the procedure of separate coding and multiplexing is defined as follows: UE has at least HARQ-ACK bits of priority index 1 and HARQ-ACK bits of priority index 0 to transmit, and may have optionally SR of either priority index 0 or 1 and/or CSI reports to transmit and the UE determines a PUCCH resource associated with second PUCCH-config and PUCCH format 3 or PUCCH format 4, after dropping CSI reports, where the UE determines the PUCCH resource using the PUCCH resource indicator field in a last of a number of DCI formats, at least including those that scheduled PDSCH(s) with respect to HARQ-ACK of priority index 1, with a value of a PDSCH-to-HARQ feedback timing indicator field indicating a same slot or a sub-slot or a sub-slot overlapping with a slot, where UE would transmit HARQ-ACK bits of priority index 0, for the PUCCH transmission, from a PUCCH resource set provided to the UE for HARQ-ACK transmission; and the UE determines the PUCCH resource set based on the criteria discussed above $O_{UCI}$ UCI bits, where $O_{UCI}$ includes HARQ-ACK bits of priority index 0 (such as $O_{ACK,0}$) and 1 (such as $O_{ACK,1}$), and SR of priority index 0 (such as $O_{SR,0}$) or 1 (such as $O_{SR,1}$), if any.

Example 8 may include the method of example 1 or some other example herein, wherein mapping of UCI bits is such that more critical bits such as HARQ-ACK bits of priority index 1, with or without SR of priority index 1, are mapped close to DMRS locations, while less critical UCI such as HARQ-ACK bits of priority index 0 are mapped in the remaining positions.

Example 9 may include the method of example 1 or some other example herein, wherein two PUCCH resource parts are identified within the PUCCH resource determined by the UE for multiplexing and transmission HARQ-ACK bits of different PHY priorities.

Example 10 may include the method of example 9 or some other example herein, wherein each PUCCH resource part is self-contained with DMRS symbols.

Example 11 may include the method of example 9 or some other example herein, wherein the resource split into two resource parts or the number of PRBs, number of symbols or in general, number of REs for each resource part depends on one or more of: payload of HARQ-ACK and/or SR bits of priority index 0, payload of HARQ-ACK and/or SR bits of priority index 1, total payload, configured maxCodeRate values to be used for each resource parts.

Example 12 may include the method of example 9 or some other example herein, wherein multiple values of maxCodeRate are configured via higher layers and a DCI format, scheduling a PDSCH and triggering a corresponding HARQ-ACK feedback for a given PHY priority indicates the applicable pair of maxCodeRate values if the HARQ-ACK feedback is expected to be multiplexed with UCI with different PHY priorities in a PUCCH with two identifiable PUCCH resource parts.

Example 13 may include the method of example 12 or some other example herein, wherein the DCI format is the one that triggers the transmission of the HP HARQ-ACK.

Example 14 may include the method of example 9 or some other example herein, wherein, at least when the two PUCCH resource parts are mapped to different symbols, each of the PUCCH resource parts are considered independently for any potential cancelation due to one or more of: overlap with any other higher priority channels/signals, conflicts with link directions including dynamic slot format indication (SFI) via DCI format 2_0, UL cancelation indication (UL CI) via DCI format 2_4, etc.

Example 15 includes a method of a user equipment (UE) comprising: receiving configuration information that includes: an indication of a first HARQ-ACK codebook or a scheduling request (SR) associated with first physical layer (PHY) priority; an indication of a second HARQ-ACK codebook or a scheduling request (SR) configuration associated with second PHY priority that is higher than the first PHY priority; an indication for a first PDSCH transmission that a corresponding HARQ-ACK transmission is based on the first HARQ-ACK codebook and is mapped to a first PUCCH resource, or an indication that a corresponding scheduling request (SR) transmission mapped to a first PUCCH resource; and an indication of a second PDSCH transmission that identifies a corresponding HARQ-ACK transmission that is based on the second HARQ-ACK codebook and is mapped to a second PUCCH resource that overlaps with first PUCCH resource, or an identification of a corresponding scheduling request (SR) transmission mapped to a second PUCCH resource; and encoding for transmission by the UE, multiplexed HARQ-ACK or SR bits based on two codebooks in a third PUCCH resource based on the configuration of second codebook such that the UCI bits corresponding to each PHY priority are separately encoded and mapped to the third PUCCH resource.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for a user equipment (UE) configured for operation in a fifth-generation new radio (5G NR) system, the apparatus comprising: processing circuitry; and memory, the processing circuitry configured to:
   decode radio-resource control (RRC) signalling comprising a physical uplink control channel (PUCCH) configuration information element (IE PUCCH-Config), the PUCCH configuration information element comprising a first maximum code rate (maxCodeRate) and a second maximum code rate (maxCodeRateLP), the first maximum code rate for transmission of High-Priority (HP) uplink control information (UCI) on a first PUCCH, the second maximum code rate for multiplexing Low-Priority (LP) hybrid automatic repeat request acknowledge (HARQ-ACK) information bits and the High-Priority UCI on a second PUCCH,
   wherein for reporting UCI of different priorities when the UE is configured to transmit overlapping PUCCHs that include the first PUCCH with HARQ-ACK information bits of priority index 0 and the second PUCCH with HARQ-ACK information bits of priority index 1, the processing circuitry is configured to:
   determine a PUCCH resource from a PUCCH resource set, the PUCCH resource set based a second PUCCH configuration using a number of the HARQ-ACK information bits of the priority index 1 and a number of the HARQ-ACK information bits of the priority index 0; and
   multiplex the HARQ-ACK information bits of the priority index 1 with the HARQ-ACK information bits of the priority index 0 in a third PUCCH using the determined PUCCH resource, for transmission to a gNode B (gNB),
   wherein when the UE is configured to transmit overlapping PUCCHs that include the first PUCCH with HARQ-ACK information bits of the priority index 0 and the second PUCCH with HARQ-ACK information bits of the priority index 1 and the HARQ-ACK bits associated with the priority index 1 are multiplexed with the HARQ-ACK bits associated with the priority index 0 for a UCI transmission in the third PUCCH, the processing circuitry is configured to encode the multiplexed HARQ-ACK bits using the second maximum code rate (maxCodeRateLP), and
   wherein the memory is configured to store the first and second maximum code rates.

2. The apparatus of claim 1, wherein when the UE is not configured to transmit overlapping PUCCHs that include the first PUCCH with HARQ-ACK information bits of the priority index 0 and the second PUCCH with HARQ-ACK information bits of the priority index 1, the HARQ-ACK bits associated with the priority index 1 are not multiplexed with the HARQ-ACK bits associated with the priority index 0 in the third PUCCH, the processing circuitry is configured to:
   encode the HARQ-ACK information bits of the priority index 0 using the first maximum code rate (maxCodeRate) for transmission on the first PUCCH; and
   encode the HARQ-ACK information bits of the priority index 1 using the first maximum code rate (maxCodeRate) for transmission on the second PUCCH.

3. The apparatus of claim 2, wherein the first maximum code rate is a higher priority maximum code rate; and
   wherein the second maximum code rate is a lower priority maximum code rate.

4. The apparatus of claim 2, wherein the UE is configured with a first HARQ-ACK codebook associated with the first PUCCH of the priority index 0 and a second HARQ-ACK codebook associated with the second PUCCH of the priority index 1, and
   wherein the HARQ-ACK information bits of the priority 0 correspond to the first HARQ-ACK codebook, and wherein the HARQ-ACK information bits of the priority 1 correspond to the second HARQ-ACK codebook.

5. The apparatus of claim 4, wherein the processing circuitry is further configured to:
decode a first downlink control information (DCI) format that includes a scheduling grant for a first physical downlink shared channel (PDSCH) and a scheduling grant for a second PDSCH.

6. The apparatus of claim 5, wherein the processing circuitry is further configured to generate the first and second HARQ-ACK codebooks based respectively on the first and second PDSCHs, and
wherein prior to transmission, the HARQ-ACK information bits of the priority index 1 are mapped to a first bit sequence and the HARQ-ACK information bits of the priority index 0 are mapped to a second sequence.

7. The apparatus of claim 4, wherein the PUCCH configuration information element includes a plurality of PUCCH resource sets, each PUCCH resource set (PUCCH-ResourceSet) having a PUCCH resource set index indicated with a pucch-ResourceSetId, each PUCCH resource set having a maximum number of UCI information bits that the UE can transmit using one of the PUCCH resources in the PUCCH resource set indicated by maxPayloadSize, and
wherein the processing circuitry is configured to determine the PUCCH resource from the plurality based on the maxPayloadSize.

8. The apparatus of claim 7, when the UE is configured to transmit overlapping PUCCHs that include the first PUCCH with HARQ-ACK information bits of the priority index 0 and the second PUCCH with HARQ-ACK information bits of the priority index 1 and the HARQ-ACK bits associated with the priority index 1 are multiplexed with the HARQ-ACK bits associated with the priority index 0 for a UCI transmission in the third PUCCH, the processing circuitry is configured to determine the PUCCH resource from the plurality based on the maxPayloadSize for number of the HARQ-ACK information bits of the priority index 1 and the number of the HARQ-ACK information bits of the priority index 0.

9. The apparatus of claim 8, when the UE is not configured to transmit overlapping PUCCHs that include the first PUCCH with HARQ-ACK information bits of the priority index 0 and the second PUCCH with HARQ-ACK information bits of the priority index 1 and the HARQ-ACK bits associated with the priority index 1 are not multiplexed with the HARQ-ACK bits associated with the priority index 0 for a UCI transmission in the third PUCCH, the processing circuitry is configured to:
determine a first PUCCH resource from the plurality based on the maxPayloadSize for number of the HARQ-ACK information bits of the priority index 1; and
determine a second PUCCH resource from the plurality based on the maxPayloadSize for the number of the HARQ-ACK information bits of the priority index 0.

10. The apparatus of claim 4, wherein the first maximum code rate (maxCodeRate) is configured for feedback of UCI on the first PUCCH for format 2, 3 or 4, and
wherein the second maximum code rate is configured for multiplexing the LP HARQ-ACK information bits and the high-priority UCI on the second PUCCH for format 2, 3 or 4.

11. A non-transitory computer-readable storage medium that stores instructions for execution by processing circuitry of a user equipment (UE) configured for operation in a fifth-generation new radio (5G NR) system, wherein the processing circuitry is configured to:
decode RRC signalling comprising a PUCCH configuration information element (IE PUCCH-Config), the PUCCH configuration information element comprising a first maximum code rate (maxCodeRate) and a second maximum code rate (maxCodeRateLP), the first maximum code rate for transmission of High-Priority (HP) uplink control information (UCI) on a first PUCCH, the second maximum code rate for multiplexing Low-Priority (LP) hybrid automatic repeat request acknowledge (HARQ-ACK) information bits and the high-priority UCI on a second PUCCH,
wherein for reporting UCI of different priorities when the UE is configured to transmit overlapping PUCCHs that include the first PUCCH with HARQ-ACK information bits of priority index 0 and the second PUCCH with HARQ-ACK information bits of priority index 1, the processing circuitry is configured to: the processing circuitry is configured to:
determine a PUCCH resource from a PUCCH resource set, the PUCCH resource set based a second PUCCH configuration using a number of the HARQ-ACK information bits of the priority index 1 and a number of the HARQ-ACK information bits of the priority index 0; and
multiplex the HARQ-ACK information bits of the priority index 1 with the HARQ-ACK information bits of the priority index 0 in a third PUCCH using the determined PUCCH resource, for transmission to a gNode B (gNB),
wherein when the UE is configured to transmit overlapping PUCCHs that include the first PUCCH with HARQ-ACK information bits of the priority index 0 and the second PUCCH with HARQ-ACK information bits of the priority index 1 and the HARQ-ACK bits associated with the priority index 1 are multiplexed with the HARQ-ACK bits associated with the priority index 0 for a UCI transmission in the third PUCCH, the processing circuitry is configured to encode the multiplexed HARQ-ACK bits using the second maximum code rate (maxCodeRateLP).

12. The non-transitory computer-readable storage medium of claim 11, wherein when the UE is not configured to transmit overlapping PUCCHs that include the first PUCCH with HARQ-ACK information bits of the priority index 0 and the second PUCCH with HARQ-ACK information bits of the priority index 1, the HARQ-ACK bits associated with the priority index 1 are not multiplexed with the HARQ-ACK bits associated with the priority index 0 in the third PUCCH, the processing circuitry is configured to:
encode the HARQ-ACK information bits of the priority index 0 using the first maximum code rate (maxCodeRate) for transmission on the first PUCCH; and
encode the HARQ-ACK information bits of the priority index 1 using the first maximum code rate (maxCodeRate) for transmission on the second PUCCH.

13. The non-transitory computer-readable storage medium of claim 12, wherein the first maximum code rate is a higher priority maximum code rate; and
wherein the second maximum code rate is a lower priority maximum code rate.

14. The non-transitory computer-readable storage medium of claim 12, wherein the UE is configured with a first HARQ-ACK codebook associated with the first PUCCH of the priority index 0 and a second HARQ-ACK codebook associated with the second PUCCH of the priority index 1, and wherein the HARQ-ACK information bits of the priority 0 correspond to the first HARQ-ACK codebook, and
wherein the HARQ-ACK information bits of the priority 1 correspond to the second HARQ-ACK codebook.

15. The non-transitory computer-readable storage medium of claim 14, wherein the processing circuitry is further configured to:
decode a first downlink control information (DCI) format that includes a scheduling grant for a first physical downlink shared channel (PDSCH) and a scheduling grant for a second PDSCH.

16. The non-transitory computer-readable storage medium of claim 15, wherein the processing circuitry is further configured to generate the first and second HARQ-ACK codebooks based respectively on the first and second PDSCHs, and
wherein prior to transmission, the HARQ-ACK information bits of the priority index 1 are mapped to a first bit sequence and the HARQ-ACK information bits of the priority index 0 are mapped to a second sequence.

17. The non-transitory computer-readable storage medium of claim 14, wherein the PUCCH configuration information element includes a plurality of PUCCH resource sets, each PUCCH resource set (PUCCH-ResourceSet) having a PUCCH resource set index indicated with a pucch-ResourceSetId, each PUCCH resource set having a maximum number of UCI information bits that the UE can transmit using one of the PUCCH resources in the PUCCH resource set indicated by maxPayloadSize, and
wherein the processing circuitry is configured to determine the PUCCH resource from the plurality based on the maxPayloadSize.

18. The non-transitory computer-readable storage medium of claim 17, when the UE is configured to transmit overlapping PUCCHs that include the first PUCCH with HARQ-ACK information bits of the priority index 0 and the second PUCCH with HARQ-ACK information bits of the priority index 1 and the HARQ-ACK bits associated with the priority index 1 are multiplexed with the HARQ-ACK bits associated with the priority index 0 for a UCI transmission in the third PUCCH, the processing circuitry is configured to determine the PUCCH resource from the plurality based on the maxPayloadSize for number of the HARQ-ACK information bits of the priority index 1 and the number of the HARQ-ACK information bits of the priority index 0.

19. An apparatus for a generation Node B (gNB) configured for operation in a fifth-generation new radio (5G NR) system, the apparatus comprising: processing circuitry; and memory, the processing circuitry configured to:
encode radio-resource control (RRC) signalling for transmission to a user equipment (UE), the RRC signalling comprising a physical uplink control channel (PUCCH) configuration information element (IE PUCCH-Config), the PUCCH configuration information element comprising a first maximum code rate (maxCodeRate) and a second maximum code rate (maxCodeRateLP), the first maximum code rate for transmission of High-Priority (HP) uplink control information (UCI) on a first PUCCH, the second maximum code rate for multiplexing Low-Priority (LP) hybrid automatic repeat request acknowledge (HARQ-ACK) information bits and the high-priority UCI on a second PUCCH,
wherein when the UE is configured for reporting UCI of different priorities when the UE is configured to transmit overlapping PUCCHs that include the first PUCCH with HARQ-ACK information bits of priority index 0 and the second PUCCH with HARQ-ACK information bits of priority index 1, the processing circuitry is configured to:
determine a PUCCH resource from a PUCCH resource set, the PUCCH resource set based a second PUCCH configuration using a number of the HARQ-ACK information bits of the priority index 1 and a number of the HARQ-ACK information bits of the priority index 0; and
decode the HARQ-ACK information bits of the priority index 1 multiplexed with the HARQ-ACK information bits of the priority index 0 in a third PUCCH received within the determined PUCCH resource,
wherein when the UE is configured to transmit overlapping PUCCHs that include the first PUCCH with HARQ-ACK information bits of the priority index 0 and the second PUCCH with HARQ-ACK information bits of the priority index 1 and the HARQ-ACK bits associated with the priority index 1 are multiplexed with the HARQ-ACK bits associated with the priority index 0 for a UCI transmission in the third PUCCH, the processing circuitry is configured to decode the multiplexed HARQ-ACK bits using the second maximum code rate (maxCodeRateLP), and
wherein the memory is configured to store the first and second maximum code rates.

20. The apparatus of claim 19, wherein when the UE is not configured to transmit overlapping PUCCHs that include the first PUCCH with HARQ-ACK information bits of the priority index 0 and the second PUCCH with HARQ-ACK information bits of the priority index 1, the HARQ-ACK bits associated with the priority index 1 are not multiplexed with the HARQ-ACK bits associated with the priority index 0 in the third PUCCH, the processing circuitry is configured to:
decode the HARQ-ACK information bits of the priority index 0 using the first maximum code rate (maxCodeRate) received from the UE on the first PUCCH; and
decode the HARQ-ACK information bits of the priority index 1 using the first maximum code rate (maxCodeRate) received from the UE on the second PUCCH.

* * * * *